US006612636B2

(12) United States Patent
Arthur et al.

(10) Patent No.: US 6,612,636 B2
(45) Date of Patent: Sep. 2, 2003

(54) HAND REFERENCE FOR CONTROL PANEL OF UTILITY VEHICLE

(75) Inventors: John Raymond Arthur, Grovetown, GA (US); Russell William Strong, Craftsbury Common, VT (US); Michael Robert Ondayko, Plymouth, MI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/945,541

(22) Filed: Aug. 29, 2001

(65) Prior Publication Data

US 2003/0042760 A1 Mar. 6, 2003

(51) Int. Cl.[7] ................................................ B62D 33/06

(52) U.S. Cl. ...................... 296/71; 296/190.01; 180/90; 180/89.12

(58) Field of Search ....................... 296/70, 71, 190.01, 296/190.08; 180/90, 89.12, 315

(56) References Cited

U.S. PATENT DOCUMENTS

| | | | | |
|---|---|---|---|---|
| 4,200,166 | A | * | 4/1980 | Hansen |
| 5,497,846 | A | * | 3/1996 | Strong ...................... 296/71 X |
| 5,924,515 | A | | 7/1999 | Stauffer et al. |
| 5,938,282 | A | | 8/1999 | Epple |
| 6,039,141 | A | * | 3/2000 | Denny ................. 180/89.12 X |
| D427,207 | S | | 6/2000 | Altmann et al. |
| D427,208 | S | | 6/2000 | Altmann et al. |
| 6,086,142 | A | * | 7/2000 | Simmons et al. ...... 296/190.01 |

* cited by examiner

*Primary Examiner*—Joseph D. Pape
(74) *Attorney, Agent, or Firm*—Polit & Erickson, LLC

(57) ABSTRACT

A hand reference for a control panel of a utility vehicle provides a gripping handle for an operator to adjust controls without observing the controls. The hand reference assists in steadying the operator's hand when fine tuning adjustments on the control panel. The hand reference is embodied as an inverted substantially U-shaped handle extending along the length of slots which guide control levers.

21 Claims, 4 Drawing Sheets

HAND REFERENCE FOR CONTROL PANEL OF UTILITY VEHICLE

TECHNICAL FIELD OF THE INVENTION

The present invention relates to utility vehicles, and particularly to control panels for utility vehicles having control levers and switches mounted thereto for operator actuation during operation.

BACKGROUND OF THE INVENTION

A utility vehicle, such as disclosed in U.S. Pat. Nos. 5,064,339 and 5,967,737 can be equipped with front-end loader buckets, and rear-mounted backhoe attachments. Tractors can also be equipped with other tools such as snowblowers, lawnmower decks, tillers, etc. Generally, the more functions a utility vehicle is equipped for, the more controls are required. In a limited-size operator station or cab, controls must be carefully arranged to provide for convenient, effective and efficient operation of the vehicle by the operator.

Utility vehicles, such as tractors, typically have control levers and switches mounted on a control panel within convenient access to the operator. These controls are positioned adjacent to the seat structure, allowing the operator to conveniently change the controls when desired.

The operation of a utility vehicle can require the operator to give attention to multiple activities and controls. It is also somewhat difficult to precisely change a control in a moving vehicle.

The present inventors have recognized the desirability of providing a hand reference on the control panel for steadying the hand when making precise adjustments to controls. The present inventors have also recognized the desirability of providing a hand reference to allow an operator to locate controls and make precise control adjustments without requiring visual confirmation of the position of the controls.

SUMMARY OF THE INVENTION

The present invention provides a hand reference carried on a control panel or mounted close to the control panel, for steadying the hand in order to make precise adjustments to control levers and switches on the control panel. Additionally, the hand reference provides to an operator, who might be otherwise preoccupied, an instant positioning of his hand based on feel of the hand reference to precisely adjust control levers and switches without needing to visually confirm the correct switches and levers are being adjusted.

According to the preferred embodiment, a hand reference in the form of a hand rest, is provided that protrudes from the control panel surface. The hand rest serves multi-functions. The hand rest not only locates the hand near the controls to be manipulated for an unobserved position index, but also minimizes arm fatigue in repetitive operations. Another function allows the operator to use the hand rest as a handhold to steady himself or herself while operating the vehicle on rough terrain or slopes.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 2:
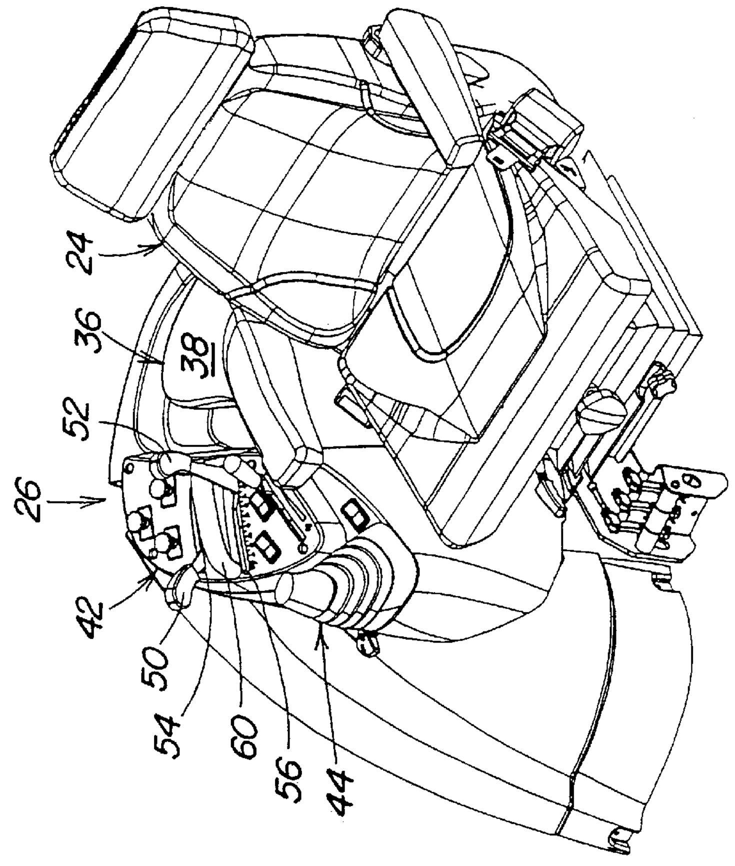
FIG. 2 is a fragmentary perspective view of an operator's seating area within the compact tractor shown in FIG. 1.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
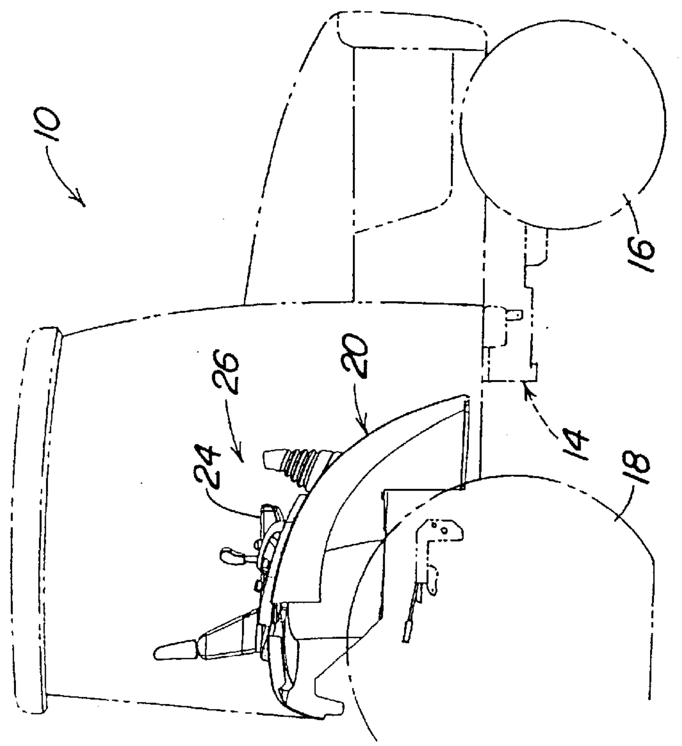
FIG. 1 is an elevational view of a compact tractor incorporating the hand reference of the present invention.

FIG. 1 illustrates a utility vehicle 10 such as a compact tractor including a chassis or frame 14 supported on front wheels and larger rear wheels 18. A floor and fender structure 20 is supported on the frame 14 and carries a seat 24 and controls 26.

Figure 3:
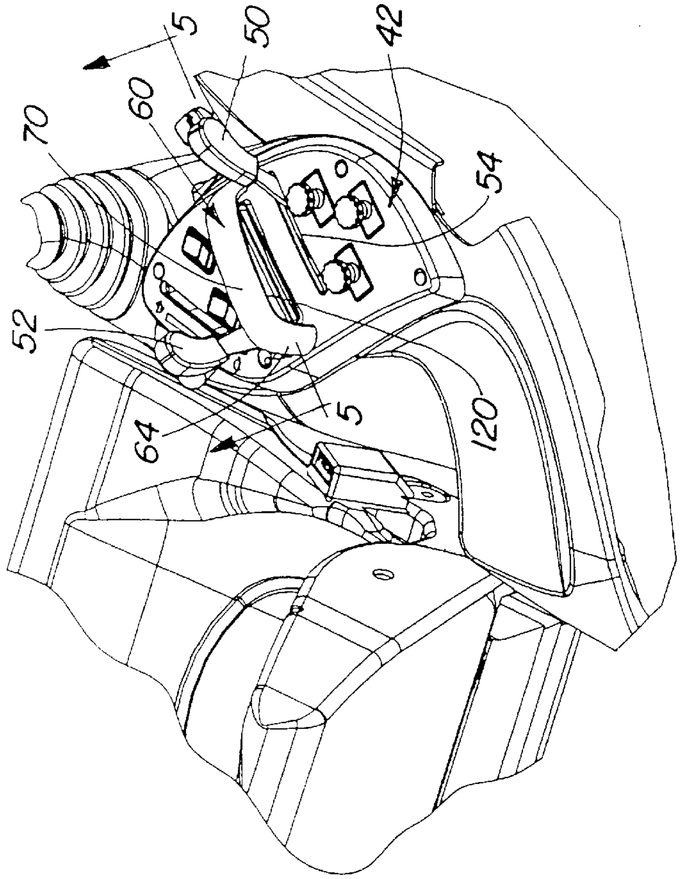
FIG. 3 is a rear fragmentary perspective view of the operator seating area shown in FIG. 2.
Figure 6:
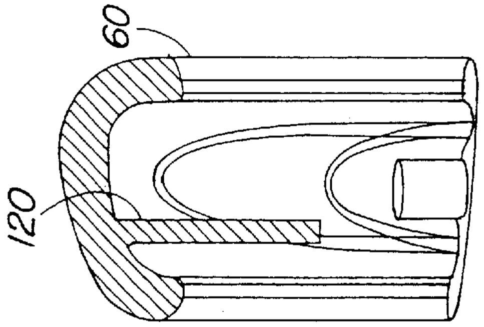
FIG. 6 is a sectional view of the hand reference taken generally along 6—6 of FIG. 5.
Figure 5:
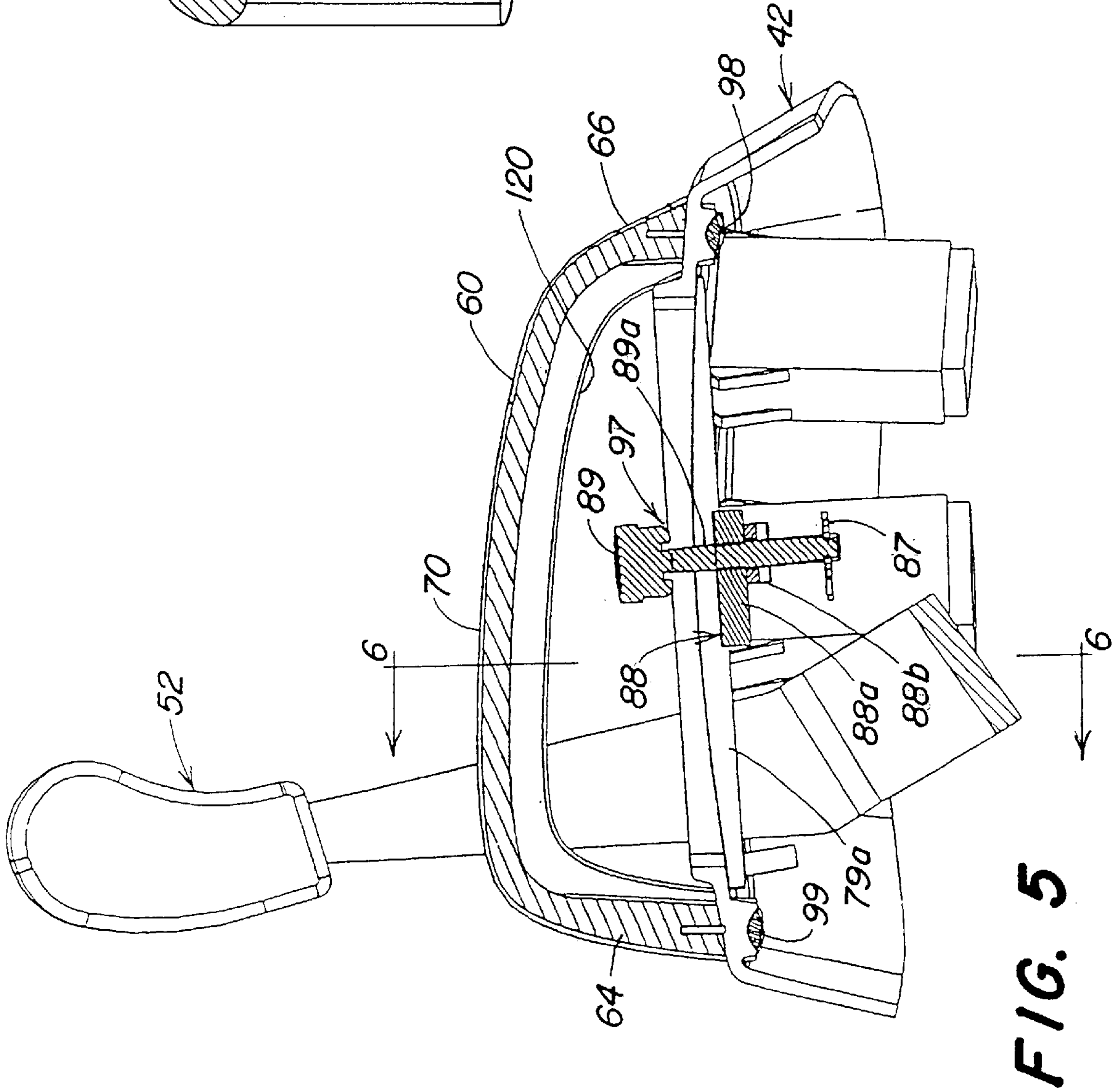
FIG. 5 is a sectional view taken generally along section 5—5 of FIG. 3.

FIGS. 2 and 3 illustrate the operator seat 24 including a left armrest 34 and right armrest 36. Adjacent to the right armrest 36 is a control panel 42 which carries the controls 26. A selective valve boot 44 is shown, the selective control valve lever not shown for clarity of description of the controls 26. Among the controls 26 on the control panel 42 is a rock shaft, or three point hitch control lever 52 and a remote valve actuation lever 50. These levers actuate in forward and reverse directions through slots 54, 56, respectively. Between the slots 54, 56, a control hand reference 60 is mounted to the panel 42.

The control hand reference 60 comprises a substantially inverted U-shaped handle having a taller back leg 64 and a shorter front leg 66. Thus, a top member 70 is declined from back to front. The control hand reference 60 provides a gripping surface for operator support during travel over rough terrain, and also provides a reference indicator for an operator to immediately recognize the correct selection and relative position of the levers 50, 52 without visually observing the levers. This can be important if the operator is otherwise preoccupied. An operator can grip the reference 60 with one or more fingers and slightly adjust either of the levers 50, 52 with remaining fingers of the same hand.

Figure 4:
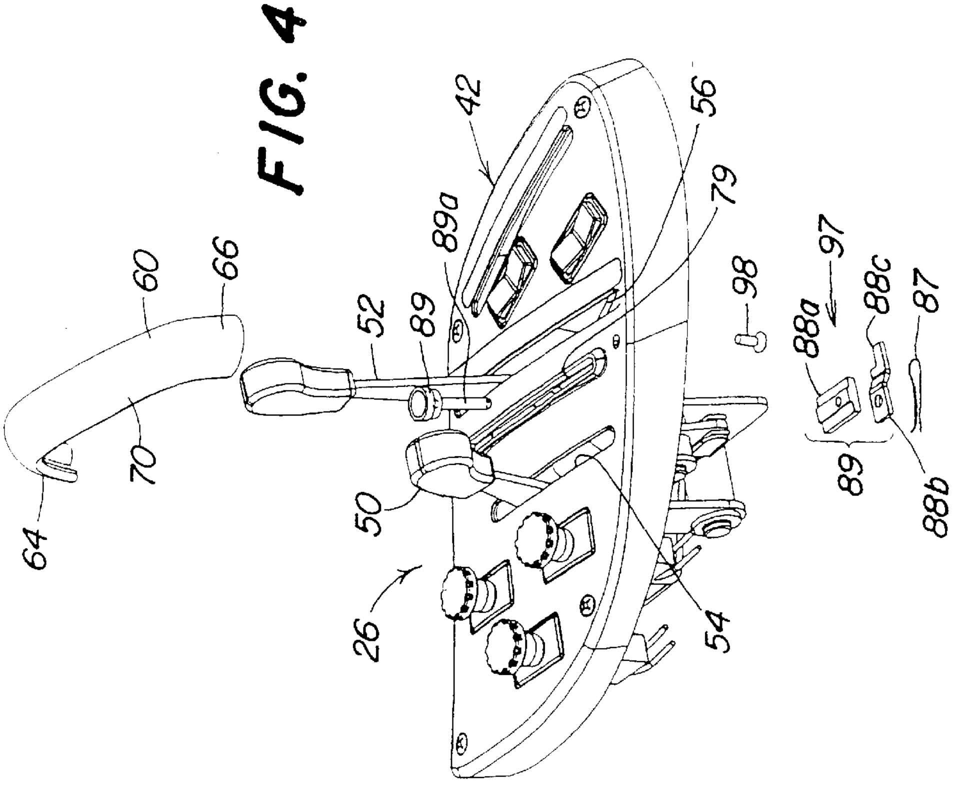
FIG. 4 is an exploded top perspective view of a control panel of FIG. 2.
Figure 7:
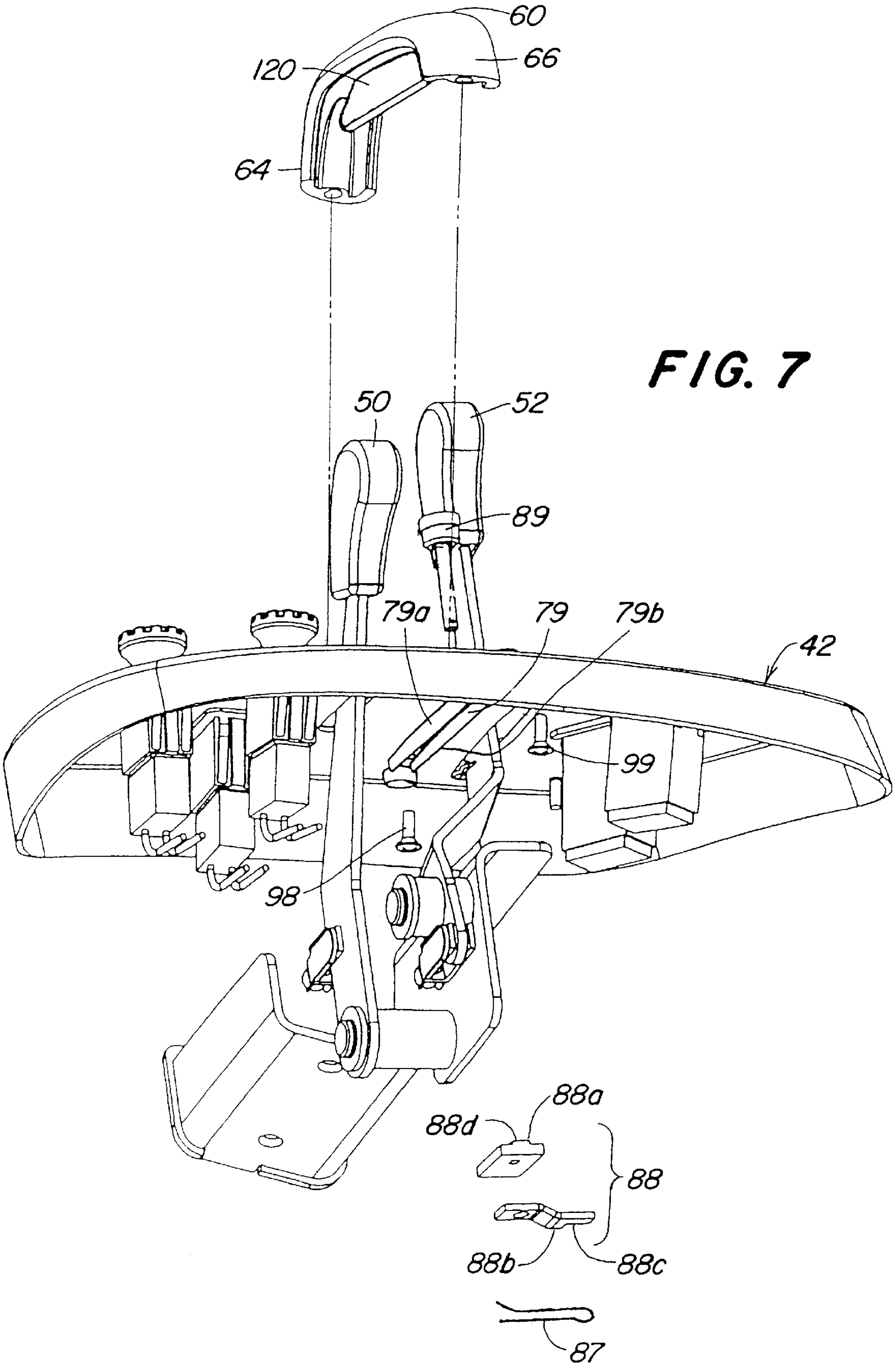
FIG. 7 is an exploded bottom perspective view of the control panel of FIG. 2.

FIG. 4 illustrates the control panel 42 separate from the remaining portions of the utility vehicle 10. The reference 60 is attached to panel 42 by two screws 98, 99. Under the reference 60 is a lever position limiting assembly 97 which is comprised of a knurled knob 89, a threaded plate 88, and a hairpin 87 or cotter pin. The purpose of the lever limiting assembly 97 is to provide an adjustable stop for lever 52 such that the operator can return the lever 52 to a chosen position accurately and repeatably. The lever limiting assembly 97 is adjusted by loosening (by turning) the knurled knob 89, moving the assembly in the slot 79 and then retightening the knob. The plate 88 includes a slide portion **88*a* welded or otherwise secured to a stop portion 88*b*. The stop portion 88*b* includes an interference portion 88*c* that extends beneath the slot 56** to interfere with movement of the lever 52 within the slot 56. The slide portion 88*a* includes a raised portion 88*d* that slides between walls 79*a*, 79*b* (FIG. 7) of the slot 79, preventing rotation of the plate 88 about an axis of the knob 89 during turning of the knob 89.

The hairpin 97 fits into a hole on a shaft 89*a* that is fixed to the knob. The distance along the shaft 89*a* from the plate (as tightened) to the hairpin 87 is such that before the raised portion 88*d* exits from between the walls 79*a*, 79*b* due to excessive loosening of the knob 89, the hairpin 87 will contact the plate 88, preventing further unscrewing.

The hand reference 60 further includes the barrier wall or web 120 which extends between the rear leg 64 and the front leg 66 of the hand reference 60 and down from the top member 70 to at least partially close the U-shaped handle. The intermediate wall 120 is a relatively thin wall compared to the width of the top member 70 such that a finger gripping beneath the top member 70 can be achieved. The intermediate wall 120 can extend completely down to the control panel 42 or it can terminate at a vertical distance from the control panel 42, the vertical distance minimized such that a finger cannot pass between the intermediate wall 120 and the control panel 42. Thus, a potential pinch point between either of the levers 50, 52 and a finger curled under the reference 60 is avoided.

The right armrest 36 includes an extended elbow region 38 which allows the operator's right arm to be rested on the elbow region 38 while using the right hand to operate the controls 26. The right hand can also rest on the hand reference 60 while the elbow is rested on the elbow region 38.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a utility vehicle having an operator's seat and at least one control carried on an adjacent control panel, the improvement comprising:

said control panel having a generally horizontal surface wherein said control extends vertically above said surface;

a hand reference extending above said surface of the control panel adjacent to the control; and said hand reference sufficiently elongated to be gripped by a plurality of fingers and the thumb of the operator, said hand reference being elongated along a direction generally collinear with the operator's arm when the operator is in said operator's seat and gripping said hand reference, said hand reference sufficiently spaced from said control to allow the operator to grip the hand reference without interference between the operator's fingers and the control.

2. The improvement according to claim 1, wherein said hand reference comprises a hand rest spaced from the control to allow gripping of the hand rest with at least one finger while operating the control.

3. In a utility vehicle having an operator's seat and at least one control carried on an adjacent control panel, the improvement comprising:

a hand reference extending above a surface of the control panel adjacent to the control;

wherein said hand reference comprises an inverted U-shaped handle.

4. The improvement according to claim 3, wherein said inverted U-shaped handle comprises an intermediate wall at least partially closing the U-shape of the handle.

5. The improvement according to claim 3, wherein said U-shaped handle has a rear leg longer than a front leg and a top member being substantially declined from rear to front.

6. The improvement according to claim 1, further comprising an elbow rest located at a distance from said hand reference, such that an operator can rest his elbow on the elbow rest and reach the hand reference to grip said hand reference.

7. A control panel for a utility vehicle, comprising:

a generally horizontal control panel top plate having a first slot therethrough;

a first control lever having a portion below the top plate and extending through said slot to be slidable therethrough;

a hand reference mounted to said top plate adjacent said first control lever, said hand reference having a generally upward facing surface and a generally downward facing surface above the top plate that are separated by a thickness of a gripping portion of the hand reference, said downward facing surface arranged for contact by at least one finger of an operator's hand for gripping of the gripping portion by the operator.

8. The control panel according to claim 7, wherein said hand reference comprises a hand rest that is elongated along said slot and having a length substantially equal to said slot.

9. The control panel according to claim 7, further comprising a second slot through said top plate, said hand reference arranged between said first and second slots, and a second control lever having a portion below said top plate and extending through said second slot, either of said first and second lever controls being operable with at least one finger gripping said hand reference.

10. The control panel according to claim 7, further comprising an adjustable stop, moveable through a further slot in the top plate and having an adjustment portion for fixing the stop at a desired position in the slot, and an interference position extending to a position to interfere with said first control lever.

11. A control panel for a utility vehicle, comprising:

a control panel top plate having a first slot therethrough;

a first control lever having a portion below the top plate and extending through said slot to be slidable therethrough;

a hand reference mounted to said top plate adjacent said control lever;

wherein said hand reference comprises a hand rest that is elongated along said slot and having a length substantially equal to said slot;

wherein said hand reference comprises an inverted substantially U-shaped handle.

12. A control panel for a utility vehicle, comprising:

a control panel top plate having a first slot therethrough;

a first control lever having a portion below the top plate and extending through said slot to be slidable therethrough;

a hand reference mounted to said top plate adjacent said control lever;

wherein said hand reference comprises a hand rest that is elongated along said slot and having a length substantially equal to said slot;

wherein said hand reference is declined along a length of said slot from rear to front.

13. A control panel for a utility vehicle, comprising:

a control panel top plate having a first slot therethrough;

a first control lever having a portion below the top plate and extending through said slot to be slidable therethrough;

a hand reference mounted to said top plate adjacent said control lever;

wherein said hand reference comprises a hand rest that is elongated along said slot and having a length substantially equal to said slot;

wherein said hand reference comprises an inverted substantially U-shaped handle, and said U-shaped handle is arranged having a top surface at an oblique angle to the surface of the top plate.

14. A control panel for a utility vehicle, comprising:

a control panel top plate having a first slot therethrough;

a first control lever having a portion below the top plate and extending through said slot to be slidable therethrough;

a hand reference mounted to said top plate adjacent said lever control;

wherein said hand reference comprises an inverted substantially U-shaped handle, and said U-shaped handle comprises an intermediate wall that substantially closes said U-shape.

15. In a utility vehicle having an operator's seat and at least one control carried on an adjacent control panel, the improvement comprising:

said control panel having a generally horizontal top surface wherein said control extends vertically above said surface;

a hand reference extending above said top surface of said control panel adjacent to said control; and said hand reference having a generally upward facing surface and sufficiently large to be gripped by a plurality of fingers and a thumb of an operator's hand and to receive the palm of the operator's hand comfortably on said upward facing surface, said hand reference sufficiently spaced from said control to allow the operator to grip the hand reference without interference between the operator's fingers and the control, and sufficiently near said control such that the operator can grip the hand reference and manipulate said control using at least one finger.

16. The improvement according to claim 15, wherein said hand reference comprises an inverted U-shaped handle.

17. The improvement according to claim 16, wherein said inverted U-shaped handle comprises an intermediate wall at least partially closing the U-shape of the handle.

18. The improvement according to claim 16, wherein said U-shaped handle has a rear leg longer than a front leg and a top member being substantially declined from rear to front.

19. The improvement according to claim 15, further comprising an elbow rest located at a distance from said hand reference, such that an operator can rest his elbow on the elbow rest and reach the hand reference to grip said hand reference.

20. The improvement according to claim 15, wherein said control panel top surface has a first slot therethrough;

said control comprises a first control lever having a portion below the top surface and extending through said slot to be slidable therethrough;

wherein said hand reference is elongated along said slot and has a length substantially equal to said slot.

21. The improvement according to claim 15, wherein said hand reference has a generally downward facing surface separated from said generally upward facing surface by a thickness of a gripping portion of the hand reference, said thickness sized for gripping of the gripping portion by said plurality of fingers and said thumb of an operator's hand.

* * * * *